No. 891,241. PATENTED JUNE 23, 1908.
B. FRANKENFIELD.
METHOD OF AND MEANS FOR STARTING DYNAMO ELECTRIC MACHINES.
APPLICATION FILED JAN. 31, 1907.
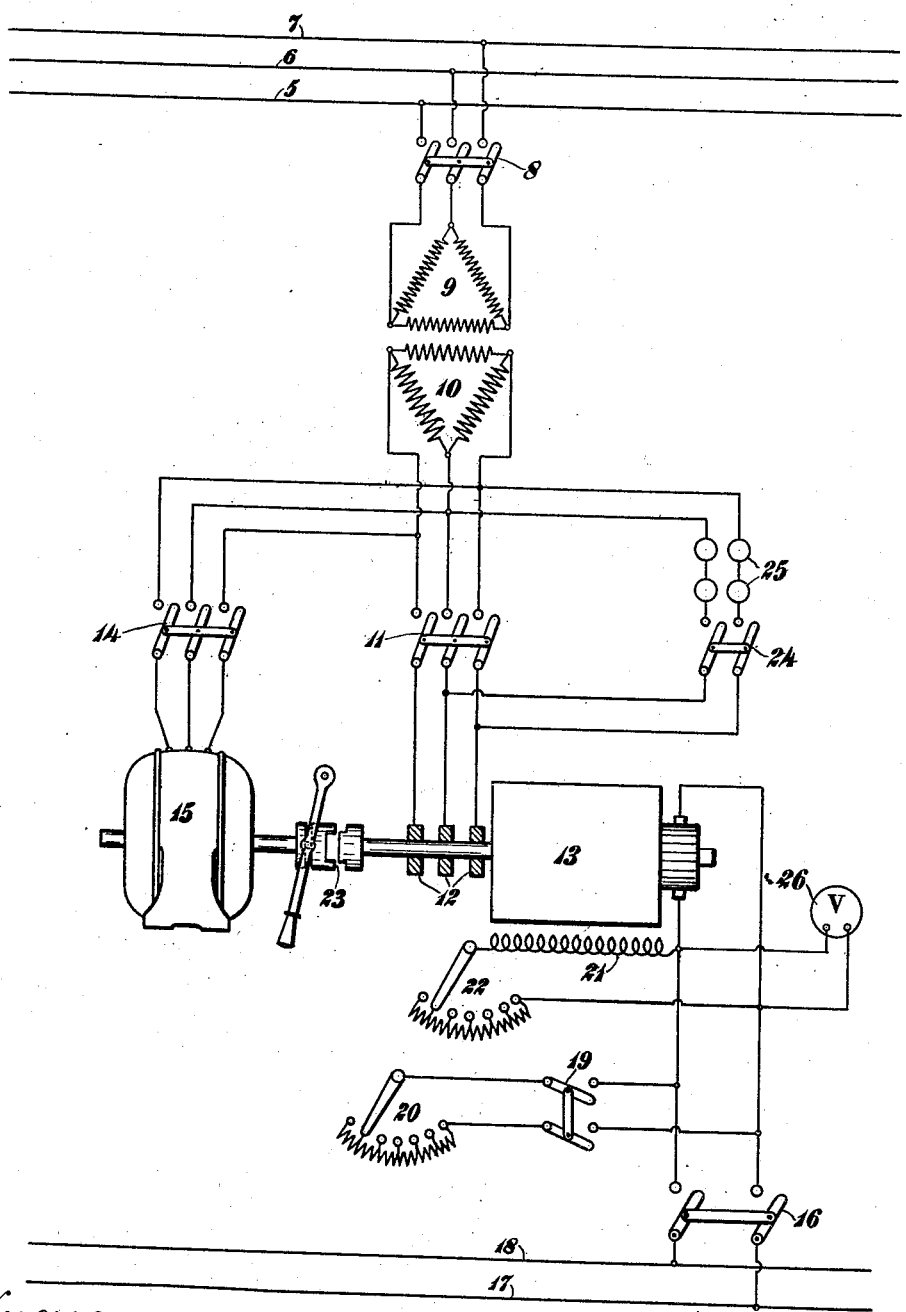

UNITED STATES PATENT OFFICE.

BUDD FRANKENFIELD, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

METHOD OF AND MEANS FOR STARTING DYNAMO-ELECTRIC MACHINES.

No. 891,241.

Specification of Letters Patent.

Patented June 23, 1908.

Application filed January 31, 1907. Serial No. 354,970.

*To all whom it may concern:*

Be it known that I, BUDD FRANKENFIELD, a citizen of the United States, residing at Norwood, in the county of Hamilton and State of Ohio, have invented certain new and useful Improvements in Methods of and Means for Starting Dynamo-Electric Machines, of which the following is a full, clear, and exact specification.
My invention relates to the method of and means for starting synchronous electric machines, such as synchronous motors and rotary converters, and its object is to provide a simple arrangement whereby such machines may be brought to synchronism and then connected to the mains.

My invention broadly consists of the method of starting a synchronous electric machine, which consists in driving such machine near synchronism by an auxiliary driving source, causing said auxiliary source to vary in speed to bring such machine nearer to synchronism, and connecting said machine to the source of current when it comes substantially into synchronism therewith.

More specifically my invention consists of a rotary converter, switches for connecting said converter to alternating and direct current mains respectively, an auxiliary motor arranged to drive said converter above synchronism, a rheostat arranged to be connected across the direct current end of said converter to put an adjustable load on said auxiliary motor to slow it down to bring the rotary converter into synchronism with the alternating current mains, and means for indicating the phase relation of the converter and said source of current.

Other features of my invention will appear from the description and drawings and will be particularly pointed out in the claims.

The single figure of the drawings shows diagrammatically one embodiment of my invention.
Referring now to the drawings 5, 6 and 7 represent three-phase alternating current mains arranged to be connected by a switch 8 to the primary 9 of a three-phase transformer. The secondary 10 of the transformer is arranged to be connected by a switch 11 to the slip rings 12 at the alternating current end of a rotary converter 13 and by a switch 14 to a self-starting alternating current motor 15. The motor 15 is here rep-
resented as a three-phase induction motor, though any other type of motor may be used. The direct current end of the rotary converter is arranged to be connected by a switch 16 to the direct current mains 17 and 18, or by a switch 19 to a rheostat 20. For reasons hereafter apparent, this rheostat 20 will be referred to as the synchronizing rheostat. The direct current side of the rotary converter also supplies its field winding 21, this field winding being adjustable in strength by a rheostat 22.

The motor 15 and the rotary converter 13 may be connected together by a clutch 23 of any desired type. The motor 15 is arranged in any desired manner to drive the rotary converter 13 somewhat above its synchronous speed. A switch 24 is arranged to connect so-called synchronizing lamps 25 across one phase of the alternating current circuit, around the switch 11. These lamps may be arranged to indicate similarity of phase either on the dark or light, though here shown as doing so on the dark. Any other form of synchronizing device may be used if desired. A voltmeter 26 should be provided for indicating the voltage of the rotary converter 13. This voltmeter may be connected to either end of the rotary converter and is here shown connected to the direct current end.

The operation of the system is as follows:— The switches 8, 11, 14, 16, 19 and preferably 24 should be open. The clutch 23 is closed. Upon closing the switches 8 and 14, preferably successively, current is supplied through the transformer 9, 10 to the auxiliary or starting motor 15, causing it to start and accelerate until it has attained its normal speed when the rotary converter 13, which has been started with the motor 15, will be slightly above synchronism. The field 21 is now built up to approximately normal value as indicated by the voltmeter 26. If previously opened, the switch 24 should now be closed to connect in the synchronizing lamps 25. By closing the switch 19, the synchronizing rheostat 20 is connected across the direct current end of the rotary converter 13 and may be adjusted to put as great a load as desired on it and the auxiliary motor 15, thus gradually slowing them down. As the rotary converter slows down and gets more nearly in synchronism with the alternating current mains, the pulsations of the lamps 25 become slower and slower. When these pulsations are sufficiently slow, the switch 11 is closed as the lamps 25 approach or reach darkness, at which time the rotary converter is approximately in phase with the alternating current mains. The interchanges of current between the alternating current mains and the rotary converter will now keep the latter in synchronism. Since the motor 15 is of no further use, it may be disconnected from the rotary converter 13 by opening the clutch 23 and may be stopped by opening the switch 14. The switch 19 is now opened to disconnect the synchronizing rheostat 20, after which the voltage of the rotary converter is properly adjusted by the rheostat 22, and the switch 16 may be closed to connect the direct current end of the rotary converter to the direct current mains 17 and 18. If desired, the switch 24 may also be opened to disconnect the synchronizing lamps 25, though this is not necessary as these lamps are short-circuited by the switch 11. The rotary converter 13 will now operate to transfer current from the alternating current mains to the direct current mains or vice versa as required.

Instead of having three-phase alternating current for the alternating current side of the rotary converter, alternating current of any desired number of phases may be used. Moreover, a motor generator set may be used instead of a rotary converter.

Ammeters, power factor meters and the like may be used when desired, these being omitted from the present drawing for the sake of simplicity. Interlocks between the various switches may be used if desired.

Many other modifications may be made in the precise arrangement shown and described in the specification and set forth in the following claims.

What I claim as new is:—

1. The method of starting a synchronous electric machine, which consists in driving such machine above synchronism by an auxiliary driving source, causing said auxiliary source to decrease in speed gradually, and connecting said machine to the source of current when it comes substantially into synchronism and phase therewith.

2. The method of starting a synchronous electric machine, which consists in driving such machine above synchronism by an auxiliary driving source, gradually increasing the load on the driving source to decrease its speed, and connecting said machine to the source of current when it comes substantially into synchronism and phase therewith.

3. The method of starting a rotary converter, which consists in driving it above synchronism by an auxiliary motor, loading the rotary converter gradually to decrease the speed of the auxiliary motor, and connecting the converter to the mains when it comes substantially into step with the electromotive force in the alternating current mains.

4. The method of starting a rotary converter, which consists in driving it above synchronism by an auxiliary motor, loading the direct current end of the rotary converter to slow down the auxiliary motor, and connecting the alternating current end to the alternating current mains when it is substantially in step with the electromotive force therein.

5. The method of starting a synchronous motor, which consists in driving it above synchronism by an auxiliary motor, loading the synchronous motor to slow down the auxiliary motor, and connecting the synchronous motor to the source of supply when it is approximately in synchronism and phase therewith.

6. The method of starting a rotary converter, which consists in driving it above synchronism by an auxiliary motor, connecting a variable resistance across the direct end of the rotary converter and varying said resistance to slow down the auxiliary motor, and connecting the alternating current end to the alternating current mains when it is substantially in step with the electromotive force therein.

7. The method of starting a synchronous electric machine, which consists in driving it near synchronism by an auxiliary motor, varying the load on said auxiliary motor to vary the speed in the proper direction to bring said synchronous machine substantially to synchronism, and connecting said synchronous machine to the source of current when it is substantially in step therewith.

8. The method of starting a rotary converter, which consists in driving it near synchronism by an auxiliary motor, varying the load on the direct current end of the rotary converter to vary the speed of the auxiliary motor in the proper direction to bring the converter closer to synchronism, and connecting the alternating current end of the rotary converter to the source of supply when it is substantially in step therewith.

9. In combination, a rotary converter, an auxiliary motor arranged to be connected to said converter to drive the latter above synchronism, means for increasing the load on the auxiliary motor to slow it down and bring the rotary converter nearer to synchronism, a device for indicating when the rotary converter is in phase, and a switch for connecting the rotary converter to an alternating source.

10. In combination, a rotary converter, an auxiliary motor for driving said converter above synchronism, a rheostat arranged to be connected across the direct current end of the rotary converter to cause the auxiliary motor to slow down to bring the rotary converter closer to synchronism, and means for connecting the rotary converter to the alternating current source.

11. In combination, a synchronous motor, an auxiliary source of power arranged to drive said motor above synchronous speed, means for causing said auxiliary motor to slow down to bring the synchronous motor more nearly to synchronism, and means for connecting the synchronous motor to a source of supply.

12. In combination, a rotary converter, an auxiliary motor arranged to drive said converter, means for varying the load on the direct current end of the rotary converter to vary the speed of the auxiliary motor, means for indicating when the rotary converter is in step, and means for connecting the two ends of the converter to alternating and direct current sources respectively.

In testimony whereof I affix my signature in the presence of two witnesses.

BUDD FRANKENFIELD.

Witnesses:
GEO. B. SCHLEY,
FRED J. KINSEY.